March 24, 1970   M. J. HETHERINGTON   3,501,947
ULTRASONIC TESTING APPARATUS
Filed Jan. 12, 1967   2 Sheets-Sheet 1

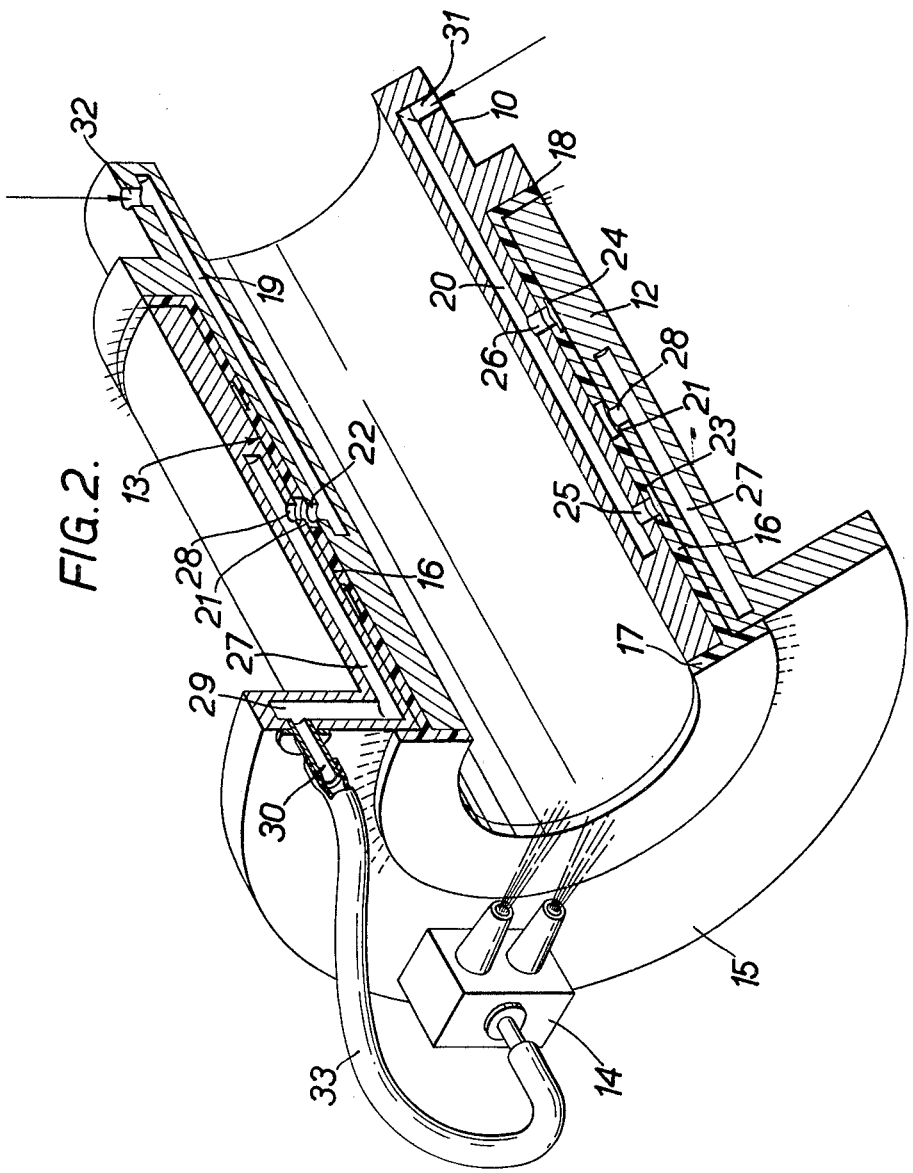

United States Patent Office 3,501,947
Patented Mar. 24, 1970

3,501,947
ULTRASONIC TESTING APPARATUS
Matthew J. Hetherington, East Carlton Park, near Market Harborough, England, assignor to Stewarts and Lloyds Limited
Continuation-in-part of application Ser. No. 334,371, Dec. 30, 1963. This application Jan. 12, 1967, Ser. No. 608,900
Claims priority, application Great Britain, Jan. 2, 1963, 248/63; Jan. 21, 1966, 2,958/66
Int. Cl. G01n 29/00
U.S. Cl. 73—71.5
6 Claims

ABSTRACT OF THE DISCLOSURE

Ultrasonic testing apparatus comprising at least one ultrasonic jet probe mounted on a fluid bearing for rapid rotation around a longitudinally moving tube or other body to be tested.

Figure 1:
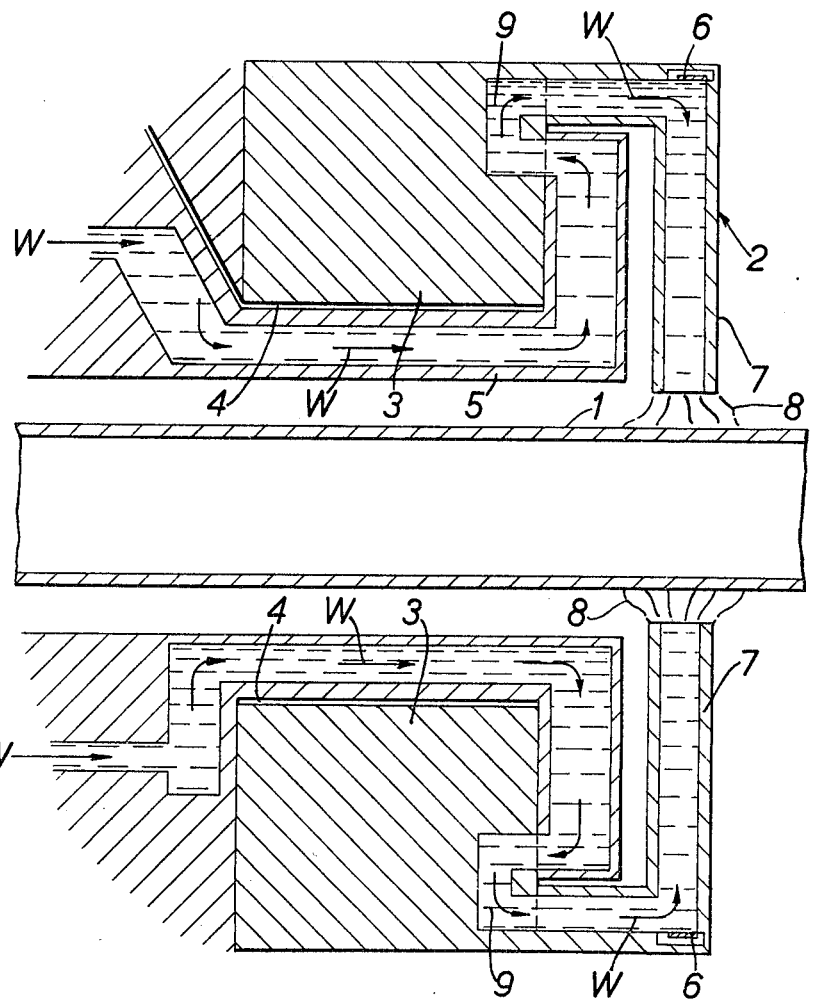

This application relates to apparatus for ultrasonic testing of round tubes and other cylindrical bodies and is a continuation-in-part of my co-pending application Ser. No. 334,371 filed Dec. 30, 1963 now abandoned.

When a round tube or other cylindrical object is rapidly scanned using a close-pitched spiral, it is a disadvantage that the speed of operation is limited by the permissible speed of rotation of the said object, and it is an object of this invention to obviate or mitigate this disadvantage.

The present invention provides apparatus for ultrasonic testing of longitudinally moving round tubes or other cylindrical bodies comprising ultrasonic scanning means, a fluid bearing on which the scanning means is mounted for rotation around a longitudinally moving tube or other body to be tested, and means for rapidly rotating the scanning means on the bearing.

Preferably the scanning means is associated with apparatus for detecting and electrically recording faults in the object.

Preferably the scanning means comprises at least one ultrasonic jet probe which uses a jet of liquid to convey ultrasonic impulses to and from the object being tested.

Suitably, the jet probe may be carried by a rotating unit mounted on a stationary unit, which rotating and stationary units have registering passageways for conveying liquid to the jet probe.

Preferably, said fluid bearing is a liquid bearing. By "a liquid bearing" is meant a bearing in which liquid is continuously fed between relatively rotating bearing surfaces so as to flow between said surfaces and prevent contact of the surfaces with one another.

A liquid bearing is particularly advantageous when the testing apparatus is used in connection with hot processes, and especially under dirty and dusty conditions, since the liquid acts both as a lubricant and as a coolant.

According to a feature of the present invention, means may be provided for feeding liquid escaping from said liquid bearing to said probe to provide liquid therefor. Depending on the dimensions of the testing apparatus and the object being tested, this escaping liquid may be sufficient to provide all of the liquid needed by the probe. However where the volume of escaping liquid is insufficient for this purpose or where it is desired to avoid reliance on said escaping liquid to supply the probe, means may be provided for supplying liquid to the probe, which means are separate from the bearing-liquid supply means. If desired said separate liquid supply means may be used in conjunction with means as aforesaid for feeding escaping bearing liquid to the probe. Alternatively, said separate liquid supply means may be employed as the sole source of probe liquid, no provision being made for feeding escaping bearing liquid to the probe.

In a preferred form of the invention, said probe is carried by a rotating unit mounted on a stationary unit, said units having registering passageways for conveying liquid to the probe and said stationary unit having a passageway for supplying liquid to the bearing. The bearing and the passageways may be so arranged that at least some of the liquid escaping from the bearing flows into the passageway in the rotating unit for conveying liquid to the probe. In practice, it may sometimes be found unnecessary to make use of the provision for a separate liquid supply to the probe, the liquid escaping from the bearing providing sufficient liquid for the probe.

Annular seals may be provided between the rotating unit and the stationary unit to provide a passageway for liquid flowing from one unit to the other, and/or to provide a passageway for an air supply to the rotating unit (e.g. for moving testing pads into engagement with the object being tested).

Preferably, said liquid is water.

From another aspect, the present invention provides ultrasonic test apparatus for detecting faults in tubing, comprising a sleeve through which the tubing under examination is passed, a cylindrical bearing surface formed externally on the sleeve and providing the inside wall of a liquid bearing, a rotary scanning head mounted on the sleeve and having a cylindrical inner surface embracing the sleeve bearing surface and forming the outside wall of the liquid bearing, ultrasonic pulse generating and receiving equipment mounted on the scanning head beyond one end of the sleeve and positioned to direct pulses of ultrasonic energy towards the tubing while spinning around it, a slip-ring and brush assembly for transmitting electrical signals to and from the equipment on the head, pipe connections formed on the sleeve for attachment to liquid supply means, openings extending through the sleeve from the pipe connections to the liquid bearing to provide liquid under pressure thereto, and ducting extending through the sleeve from the pipe connections to an annular channel formed in the liquid bearing and from which further ducting extends through the scanning head to nozzles associated with the ultrasonic equipment; the arrangement of nozzles, ducting and annular channel being such that an uninterrupted stream of liquid can flow during rotation of the head from the liquid connections to the nozzles which provide jets of liquid for transmitting energy between the ultrasonic equipment and the outside surface of the tubing under examination.

The following is a description, by way of example, of two embodiments of the present invention, reference being made to the accompanying schematic drawings, in which:

FIG. 1 is an axial section of one form of apparatus according to the invention, and FIG. 2 is a cut-away perspective view of another form of apparatus according to the invention.

Referring to FIG. 1, apparatus for non-destructive examination of tubular objects includes means for traversing a tubular object 1 longitudinally and without rotation past ultrasonic scanning means 2, and means for rotating said scanning means rapidly round the object 1. The scanning means is carried by a rotating unit 3 supported by an air bearing 4 on a stationary inner unit 5. The air bearing 4 is fed from a source (not shown) through conduit 4'. The inner unit 5 is co-axial with the tubular object 1. The scanning means 2 includes crystals 6 which generate ultrasonic impulses, and ultrasonic probes 7, the electrical connections to which crystals are effected by means of slip rings. A jet of water 8 proceeding from the probe 7 plays on the tubular object 1 and conveys ultrasonic impulses to and from it, these are then converted into an electrical signal which is recorded.

Longitudinal movement of the rotating unit 3 on the air bearing 4 is prevented by air thrust bearings (not illustrated) provided at each end of the apparatus, which bearings locate the rotating unit, the power for which is obtained by making the unit the rotor of an air turbine.

The arrows W indicate the direction in which water flows from the stationary unit 5, through an annular passage in the stationary unit 5 to a series of arcuate C-shaped passages or C-shaped conduits 9 in the rotating unit 3, concentric with the tubular object 1, to the probes 7.

An advantage of the arrangement is that, since the rotating unit is supported on an air film no lubrication is necessary.

A further advantage is that air bearings minimise the effect of vibration and do not introduce any other unwanted variables.

The apparatus illustrated in FIG. 2 comprises a stationary tubular body 10 (e.g. of bronze) through which the tube or other body to be tested can be passed axially. The body 10 has an external sleeve 16 of suitable laminated plastic (e.g. Tufnol) with two end thrust plates 17 and 18 of the same plastic. A rotatable tubular body 12 is mounted by a water bearing 13 on the sleeve 16 co-axially with the body 10. The rotatable body 12 carries at one end an annular face plate 15 on which are mounted ultrasonic probe units 14 (only one of which is shown in the drawing) adapted to be coupled to the object being tested by jets of water for transmitting ultrasonic impulses.

There are six passages in the wall of the stationary body 10 drilled parallel to the axis of rotation. Three of these passages (one of which is indicated at 19) are substantially shorter than the other three passages (one of which is indicated at 20). The passages 19 and 20 are disposed alternately and are spaced at 60° from each other. The sleeve 16 is parted midway of its length to provide an annular passage 21 and the three passages 19 are connected to this annular passage by three radial holes 22. Two annular grooves 23 and 24 are machined in the outside of the sleeve 16, the annular groove 23 being connected to the passages 20 by three radial holes 25 and the annular groove 24 being connected to the passages 20 by three radial holes 26.

The wall of the rotatable body 12 is hollow over about two-thirds of its length, thus providing an annular cavity 27. This cavity 27 is connected to the central bore of the body 12 by six radial holes 28 which register with the annular passage 21 in the sleeve 16. The face plate 15 has two radial passages 29 which connect the annular cavity 27 with standpipes 30. The standpipes 30 are connected by pipes 33 with the probe units 14.

Each of the passages 20 has a radial water inlet port 31 while each of the passages 19 has a radial water inlet port 32.

Dimensional tolerances allow a working clearance (e.g. of 0.0035"–0.0065") between the rotating body 12 and the sleeve 16.

In use, water is fed to the three ports 31 and flows along the passages 20 and through the holes 25 and 26 into the annular grooves 23 and 24. From these grooves, the water spreads along the bearing surfaces. Water spreading axially outwards from the grooves 23 and 24 eventually passes between the end thrust plates 17 and 18 and the ends of the rotatable body 12, so giving a complete liquid suspension of the body 12. Water spreading axially inwards from the grooves 23 and 24 passes into the annular passage 21. Water is fed through the ports 32, along the passages 19, through the holes 22 into the annular passage 21 (there mixing with the water escaping from the bearing 13), through the holes 28 to the annular cavity 26, along this cavity, through the passages 29 to the standpipes 30 and thence, through the pipes 33, to the probe units 14.

The water fed to the ports 31 is preferably at a substantially higher pressure than the water fed to the ports 32. (For example, the pressures may be 10–15 p.s.i. and about 5 p.s.i. respectively.) Due to the comparatively small escape area, water entering the annular passage 21 from the bearing 13 is at a much lower pressure than the bearing pressure and therefore mixes with the probe water with no adverse effects. On the other hand, due to the higher pressure in the bearing, the probe water is effectively prevented from passing into the bearing and can pass only through the holes 28 and so to the probe units. Therefore, no mechanical seals are required between the two water supplies.

In some circumstances (which may occur when testing pipes of very small diameter and using small ultrasonic transducer crystals), a separate supply of water to the probe units through the ports 32 is not required and water escaping from the bearing is sufficient to feed the probe units.

Any suitable means may be employed for rotating the body 12 at high speed around the object being tested. Any suitable probe units may be employed, electrical connections with the ultrasonic transducers of the probe units being established by a brush and slip-ring arrangement. Any suitable means may be used for interpreting the electrical signals from the transducers. The apparatus described above may advantageously be used in automatic recording apparatus as described in the complete specification of my patent application Ser. No. 334,308.

I claim:

1. Ultrasonic test apparatus for detecting faults in tubing, comprising a tubular body through which the tubing under examination is passed, a first cylindrical bearing surface formed externally on said tubular body, a rotary scanning head rotatably mounted on said tubular body, a second cylindrical bearing surface formed internally on said rotary scanning head and extending co-axially about and with a clearance from said first cylindrical bearing surface, means for generating and receiving ultrasonic pulses mounted on said scanning head beyond one end of said tubular body and positioned to direct pulses of ultrasonic energy towards the tubing while spinning around it, nozzle means associated with said generating and receiving means for directing coupling liquid therefrom to said tubing, liquid inlet means in said tubular body for attachment to liquid supply means, first passage means extending through said tubular body from said liquid inlet means to said clearance for supplying liquid under pressure thereto to form a liquid bearing between said tubular body and said scanning head, means defining an annular channel in said tubular body, second passage means in said tubular body connecting said liquid inlet means to said annular channel, third passage means in said scanning head connecting said annular channel to said nozzle means, whereby an uninterrupted stream of the coupling liquid can flow during rotation of said scanning head from said inlet means to said nozzle means which provide jets of the coupling liquid for transmitting ultrasonic energy between said generating and receiving means and the outside surface of the tubing under examination.

2. Ultrasonic testing apparatus for ultrasonic scanning of a longitudinally moving cylindrical body, comprising a rotary unit mounted for rotation about said cylindrical body, a stationary unit supporting said rotary unit, at least one ultrasonic jet probe on said rotary unit, said ultrasonic jet probe comprising means to generate and receive ultrasonic pulses, a coupling fluid passage means extending past said ultrasonic generator, and first outlet means at one end of said coupling fluid passage for discharging a jet of coupling fluid therefrom to said cylindrical body, and inlet opening in said rotary unit communicating with said coupling fluid passage means, a clearance between said rotary unit and said stationary unit, at least one fluid supply passage in said stationary unit communicating with said clearance to form a liquid bearing between said rotary and stationary units and with said rotary unit inlet opening to supply coupling fluid to said coupling fluid passage.

3. Ultrasonic testing apparatus as set forth in claim 2, further comprising an outlet opening means in said stationary unit communicating with said rotary unit inlet opening, said at least one fluid supply passage including first and second fluid supply passages in said stationary unit, said first supply passage communicating with said rotary unit inlet opening for supplying coupling fluid to said coupling fluid passage and said second fluid supply passage communicating with said clearance for supplying bearing fluid to form said fluid bearing.

4. Ultrasonic testing apparatus as set forth in claim 2, further comprising spacing between said rotary and stationary units placing said clearance in communication with said rotary unit inlet opening for feeding bearing liquid escaping from said liquid bearing to said probe.

5. Ultrasonic testing apparatus as set forth in claim 4, wherein said at least one fluid supply passage in said stationary unit is adapted to supply all of said coupling fluid to said rotary unit inlet opening through said spacing.

6. Ultrasonic testing apparatus as set forth in claim 4, further comprising an outlet opening means in said stationary unit communicating with said rotary unit inlet opening, said at least one fluid supply passage including first and second fluid supply passages in said stationary unit, said first supply passage communicating with said rotary unit inlet opening for supplying coupling fluid to said coupling fluid passage and said second fluid supply passage communicating with said clearance for supplying bearing fluid to form said fluid bearing.

References Cited
UNITED STATES PATENTS

| | | | |
|---|---|---|---|
| 1,906,715 | 5/1933 | Penick | 308—9 |
| 2,532,795 | 12/1950 | Underwood et al. | 308—9 |
| 2,751,783 | 6/1956 | Erdman | 73—67.8 |
| 3,121,324 | 2/1964 | Cowan | 73—67.8 XR |

JAMES J. GILL, Primary Examiner

J. P. BEAUCHAMP, Assistant Examiner

U.S. Cl. X.R.

73—67.8; 310—8.7